Patented Jan. 8, 1952

2,581,913

UNITED STATES PATENT OFFICE 2,581,913

METHODS OF MAKING STANNOUS SALTS OF POLYHYDROXY AROMATIC COMPOUNDS

George E. P. Smith, Jr., Akron, Ohio, assignor to The Firestone Tire & Rubber Company, Akron, Ohio, a corporation of Ohio No Drawing. Application May 22, 1948, Serial No. 28,728

7 Claims. (Cl. 260—429)

This invention relates to the preparation of stannous catecholates, including, for example, stannous catecholate, stannous p-methylcatecholate, stannous p-isopropylcatecholate, stannous o-ethylcatecholate, stannous 4,5-dimethylcatecholate, stannous 4,6-di-(tert-butyl) catecholate, the stannous mono-, di-, etc., hexyl-, heptyl-, octyl-, nonyl-, decyl-, dodecyl-, etc. catecholates, the stannous trimethyl-, etc. catecholates, stannous tetramethylcatecholate, stannous p-phenylcatecholate, stannous p-cyclohexylcatecholate, stannous p-isobornyl catecholate and other stannous terpene catecholates, etc.

The word catechol is used herein to refer to o-dihydroxybenzene, sometimes called pyrocatechin. The stannous compounds are called normal catecholates to distinguish these compounds which contain one molecular weight of tin to one molecular weight of catechol from complexes, etc., in which the ratio of tin to catechol is different from 1:1. The normal salts may be hydrates.

According to this invention the stannous compounds are formed by first treating a solution of the catechol with stannous chloride (or other soluble salt of a mineral acid, as, for example, stannous sulfate, stannous bromide, etc.), and then adding alkali. The alkali may be sodium hydroxide, potassium hydroxide, etc. Any inert neutral mutual solvent may be used. Water is generally satisfactory for the materials of lower molecular weight, and some alcohol will usually be used with the higher molecular weight derivates which are less soluble in water. In the preferred operation the catechol and tin salt are reacted in molecular proportions. Two molecular proportions of sodium hydroxide or the like are required, although commercially there may be an economic advantage in using some excess, just as some excess of the tin salt or catechol might be used up to 10 or 20 per cent without departing from the intent of reacting in molecular proportions.

The following examples are illustrative of the process.

EXAMPLE 1

*Stannous catecholate*

Two hundred grams of catechol (1.8 mole) were dissolved in 600 millimeters of water; 410 grams of stannous chloride dihydrate (1.8 mole) were dissolved in 900 milliliters of water and added to the first solution. A concentrated aqueous solution of 145 grams of sodium hydroxide (3.6 moles) was dropped in with stirring. The first brownish precipitate was discarded. The light-colored precipitate, separating as more alkali was added, was filtered off and dried in air at 30 to 40° C. Yield 330 grams.

Analysis:
Calc. for $C_6H_4O_2Sn$ _____ Sn=52.34%
Found 50.7% (microgravimetric)

EXAMPLE 2

*Stannous p-tert-butylcatecholate*

One hundred grams (0.6 mole) of p-tert-butylcatechol was dissolved in 300 ml. ethanol. One hundred fifty grams (0.67 mole) of stannous chloride dihydrate was added with shaking. It dissolved almost completely. The reaction mixture was chilled in an ice bath and stirred mechanically while there was dropped into it 55 grams of sodium hydroxide (1.38 mole) dissolved in 225 ml. of water. Fifty milliliters of water and 50 ml. of ethanol were added as the mixture became thick. Then 75 ml. additional water was added for thinning. The reaction mixture was filtered, washed with water and ethanol, and then dried in air at about 35° C. Yield 180 grams.

EXAMPLE 3

*Stannous p-tert-butylcatecholate*

Stannous p-tert-butylcatecholate was prepared by dissolving 10 grams of p-tert-butylcatechol in an aqueous solution containing 5.1 grams of sodium hydroxide. A blood red solution was obtained, to which was added slowly and with stirring 13.6 grams of stannous chloride dihydrate in 100 cc. of water. The red color disappeared as a pure white precipitate was formed. The precipitate was separated and dried.

EXAMPLE 4

*Stannous 4-tert-butyl-3-methylcatecholate*

Nine and five-tenths grams of 4-tert-butyl-3-methylcatechol and 11.9 grams of stannous chloride dihydrate were dissolved in 200 ml. of methanol. To the resulting solution a solution of 4.2 grams of sodium hydroxide in 200 ml. of 25 per cent methanol were added slowly while stirring. The resulting precipitate was filtered, washed with alcohol-water and then with water. Yield 12.6 grams.

EXAMPLE 5

*Stannous dibutylcatecholate*

Twenty-two and two-tenths grams of dibutylcatechol (.1 mole) and 22.6 grams of stannous chloride dihydrate were dissolved in 500 ml. of ethyl alcohol. A solution of 8.0 grams of sodium hydroxide in 150 ml. of 40 per cent alcohol was added slowly during stirring. The resulting precipitate was filtered. It was washed with alcohol and then with alcohol-water. The yield was 23.0 grams of dried stannous dibutylcatecholate.

EXAMPLE 6

*Stannous octylcatecholate*

Nine and five-tenths grams of octylcatechol was dissolved in 150 ml. of methanol. Nine and six-tenths grams of stannous chloride dihydrate was then dissolved in the resulting solution. To this was added a solution of 3.4 grams of sodium hydroxide in 250 ml. of 20 per cent methanol. The precipitate was filtered with suction, washed with methanol-water and then with water, and then dried. Yield 13.3 grams.

EXAMPLE 7

*Stannous octyl-4-methylcatecholate*

Seven and five-tenths grams of octyl-4-methyl catechol was dissolved in 150 ml. of methanol and then 7.2 grams of stannous chloride dihydrate was added and dissolved. A solution of 2.54 grams of sodium hydroxide in 100 ml. of 25 per cent methanol was added slowly during stirring. The precipitate was filtered, washed once with methanol-water and twice with water. The dried product weighed 9.6 grams.

EXAMPLE 8

*Stannous heptylcatecholate*

Six and five-tenths grams of heptylcatechol and 7.1 grams of stannous chloride dihydrate were dissolved in 150 ml. of methanol. To this a solution of 2.5 grams of sodium hydroxide in 250 ml. of 15 per cent methanol was added. The product was filtered with suction, washed with water-alcohol, and then with water. When dry it weighed 9.0 grams.

EXAMPLE 9

*Stannous 4,5-dimethylcatecholate*

Six and five-tenths grams of 4,5-dimethylcatechol was dissolved in 100 ml. of 30 per cent methanol and 10.6 grams of stannous chloride dihydrate was added. To the resulting solution a solution of 3.76 grams of sodium hydroxide in 100 ml. of water was added slowly during stirring. The precipitate was filtered and washed with methanol-water. After drying it weighed 11.7 grams.

EXAMPLE 10

*Stannous p-tert-butylcatecholate*

Ten grams of p-tert-butylcatechol and 11.4 grams of anhydrous stannous chloride were dissolved in alcohol (ordinary 95 per cent ethanol). To this was added slowly and with stirring a solution of 5.1 grams of sodium hydroxide in water. A heavy white solid was formed by precipitation. The slightly alkaline solution was made just neutral by dilute hydrochloric acid, although this is not essential. The white solid was filtered, washed with water and alcohol and dried. The yield was 21.7 grams. (The yield was greater than theoretical probably because of moisture which is retained in the solid and is removed with difficulty by ordinary drying.)

EXAMPLE 11

*Stannous salt of 3,4-dihydroxydiphenyl (p-phenyl catechol)*

Eighteen and six-tenths grams of 3,4-dihydroxydiphenyl was dissolved in 50 per cent ethyl alcohol and then a solution of 22.6 grams of stannous chloride dihydrate in 50 per cent alcohol-water was added. Then a solution of 8 grams of sodium hydroxide in 100 ml. of water was added slowly during stirring. The precipitate was filtered, washed with 50 per cent alcohol and then with 95 per cent alcohol. After drying the product weighed 24.5 grams.

What I claim is:

1. The process of producing the normal stannous salt of a compound of the class consisting of catechol and hydrocarbon-substituted catechols which comprises dissolving the compound and stannous salt of a mineral acid in a non-acid, inert solvent in which the first salt is insoluble, and then adding alkali so as to form and precipitate the salt, the reactants being used in the ratio of two molecular proportions of alkali for one molecular proportion of catechol and one molecular proportion of the stannous salt.

2. The process of producing the normal stannous salt of catechol which comprises dissolving equimolecular proportions of catechol and stannous chloride in water, adding two molecular proportions of sodium hydroxide for each molecular proportion of catechol and stannous chloride, and then filtering.

3. The process of producing the normal stannous salt of a hydrocarbon-substituted catechol which comprises dissolving the hydrocarbon-substituted catechol and stannous chloride in equimolecular proportions in an inert non-acid aqueous solution which is a mutual solvent for the two but in which the stannous catecholate is not soluble, then adding two molecular proportions of sodium hydroxide for each molecular proportion of the hydrocarbon-substituted catechol and the stannous chloride, and then filtering.

4. The process of producing the normal stannous salt of catechol which comprises reacting catechol and stannous salt of a mineral acid in water solution in molecular proportions, and then adding two molecular proportions of alkali to precipitate the stannous catecholate.

5. The process of producing the normal stannous salt of a hydrocarbon-substituted catechol which comprises reacting the hydrocarbon-substituted catechol and stannous salt of a mineral acid in molecular proportions in an inert solvent in which the normal salt is insoluble, and then adding two molecular proportions of alkali for each molecular proportion of the hydrocarbon-substituted catechol and the stannous salt to precipitate said normal salt.

6. The process of producing the normal stannous salt of catechol which comprises reacting catechol and stannous chloride in water solution in molecular proportions, then adding two molecular proportions of sodium hydroxide for each molecular proportion of the catechol and the stannous chloride, and filtering 7. The process of producing the normal stannous salt of a hydrocarbon-substituted catechol which comprises reacting the hydrocarbon-substituted catechol and stannous chloride in molecular proportions in an inert common solvent in which the normal salt is insoluble, then adding two molecular proportions of sodium hydroxide for each molecular proportion of the hydrocarbon-substituted catechol and the stannous chloride, and filtering.

GEORGE E. P. SMITH, JR.

REFERENCES CITED

The following references are of record in the file of this patent:

UNITED STATES PATENTS

| Number | Name | Date |
|---|---|---|
| 2,514,180 | Carr | July 4, 1950 |

OTHER REFERENCES

Weinland et al. (I) "Zeit. anorg. Chem."—vol. 126 (1922), pages 145–147, 166.

Weinland et al. (II) "Zeit. anorg. allgem. Chem."—vol. 150 (1926), pages 72, 79, 80.